March 12, 1968   R. M. McCASH   3,372,951
TOOL ADAPTER FOR RECIPROCATING DRAWBOLT CONNECTION
Filed March 21, 1966   3 Sheets-Sheet 1

INVENTOR.
Robert M. Mc Cash
BY
Howard T Keiser
& Jack J. Earl
ATTORNEYS

United States Patent Office 3,372,951
Patented Mar. 12, 1968

3,372,951
TOOL ADAPTER FOR RECIPROCATING DRAWBOLT CONNECTION
Robert M. McCash, Cincinnati, Ohio, assignor to The Cincinnati Milling Machine Co., Cincinnati, Ohio, a corporation of Ohio
Filed Mar. 21, 1966, Ser. No. 535,765
3 Claims. (Cl. 287—91)

The present invention relates to power actuated draw bars in milling machine spindles and more particularly to an improved bayonet adapter providing a surface on a tool by which it can be gripped by the draw bar.

The use of bayonet type adapters in combination with a draw bar moving only axially in a powered reciprocal stroke has become particularly desirable as a means for securing tools in the spindle of a machine having automatic tool changing capabilities due to the quickness operation. In these automatic tool changing machines, accurate location of the tool on a predetermined center line after clamping or securing is a necessity particularly when long tools such as drills, reamers and boring bars are the tools to be changed since a small angular misalignment can result in a relatively large orbital path of the tip of these tools producing oversize holes. Bayonet type tool gripping devices, however, frequently produce a tendency to shift the tool laterally due to slight off centering of the adapters or to uneven operation of the gripping mechanism of the draw bar. Therefore it is an object of this invention to provide a bayonet adapter for a tool which will not transmit any substantial lateral forces to a cutting tool in a spindle, but which will transmit large axial forces to hold the tool firmly in the spindle.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

This invention provides a threaded adapter sleeve that is insertable into an aperture in the rearward end of the tool having mating threads. The adapter sleeve is open through its center to loosely receive a bayonet member having one end on which a surface is provided to be gripped by a drawbar mechanism. Means are provided for permitting the bayonet member to swivel a limited amount in the adapter sleeve upon the application of a lateral force thereon and for transmitting axial forces between the adapter sleeve and bayonet member. Means are provided also tending to maintain the bayonet member central within the adapter sleeve and in axial alignment therewith but this means is yieldable to allow for swivel movement of the bayonet member in the adapter sleeve to a position slightly out of its parallel alignment in response to lateral forces applied thereto during its attachment to the drawbar. A clear understanding of the invention can be obtained from the following detailed description in which reference is made to the attached drawings wherein:

FIGS. 1 and 2 comprise a longitudinal section view of a milling machine spindle and drawbar assembly with a tool held therein.

Figure 1:
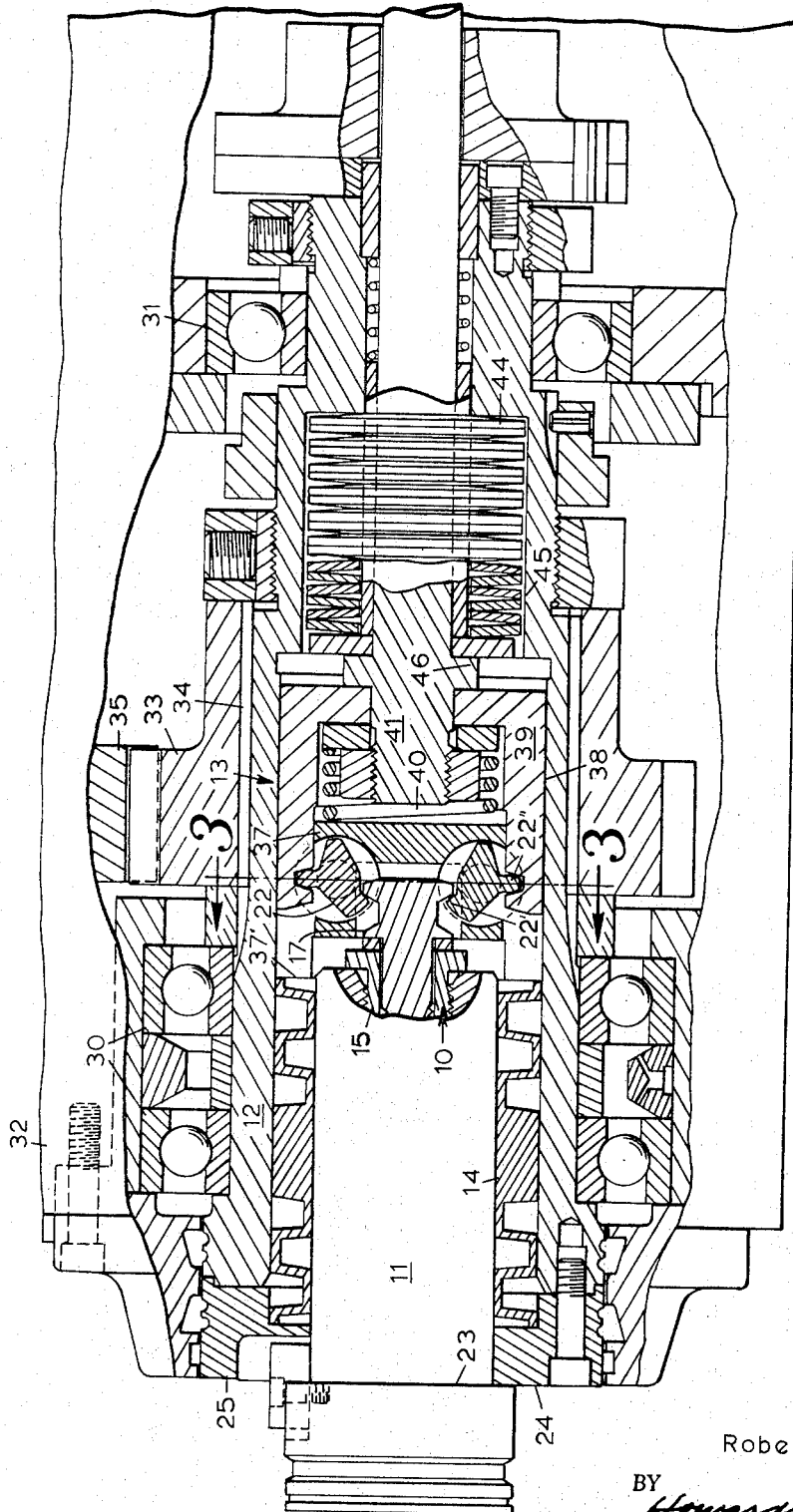
Figure 8:
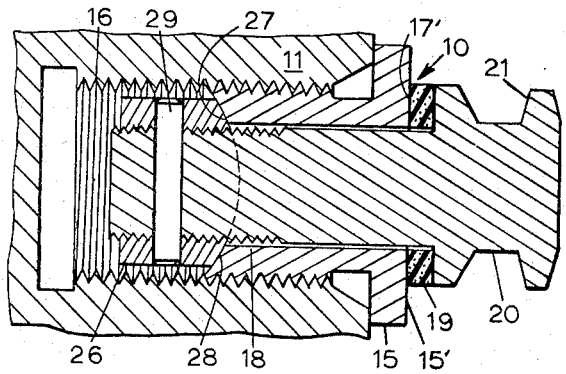
FIG. 8 is an enlarged view of a portion of FIG. 1 showing the bayonet adapter mechanism of this invention in longitudinal section.
Figure 9:
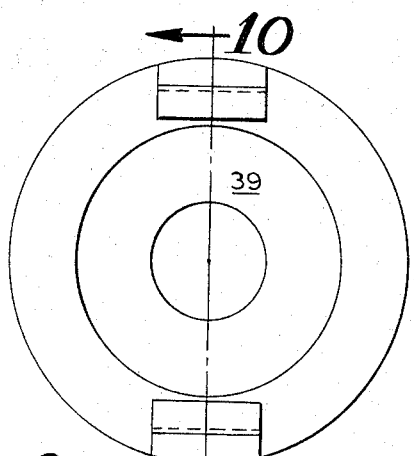
FIG. 9 is a detailed view in elevation of a member within the assembly of FIG. 1.
Figure 10:
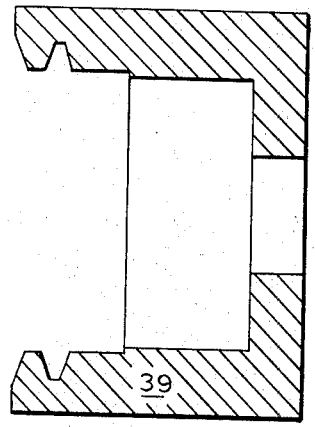
FIG. 10 is a section view of the member of FIG. 9 on line 10—10 thereof.
Figure 11:
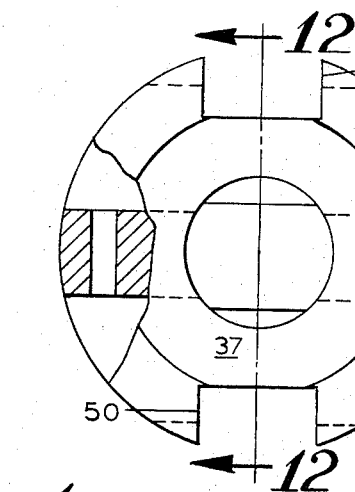
FIG. 11 is a detailed view, partly in section and partly in elevation, of another member within the assembly of FIG. 1.
Figure 12:
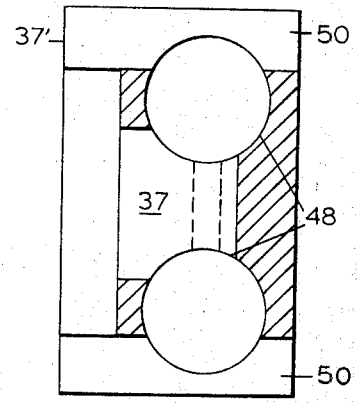
FIG. 12 is a section view of the member of FIG. 11 as viewed along line 12—12.

The byaonet adapter 10 of this invention is shown as a unit, in FIGS. 1 and 8, mounted in a tool 11 that is retained in a spindle 12 by a power actuated drawbar mechanism 13 and an accordian type centering and gripping sleeve or bushing 14.

The adapter 10 comprises an adapter sleeve 15 threadedly received in the bore 16 of the tool 11, a bayonet member 17 suspended in a clearance bore 18 of the adapter sleeve 15 and a washer 19 which is made of a resilient material such as sponge rubber specifically indicated in FIG. 8 disposed around the bayonet member 17 and between an annular shoulder 17' on said member and an annular face 15' on the sleeve 15. Numerous other soft resilient materials such as soft, solid rubber or plastic compounds that tend to regain their original shape after deformation can be used in place of the foam rubber disclosed and will work equally as well. Also the washer 19 might be replaced by a toroidal coil spring or a plurality of springs around the bayonet member 17 acting in the direction of its axis same aligning and centering forces. These alternate expedients are considered to be the full equivalents of the washer 19, however. It is the purpose of the washer 19 to yieldably hold the bayonet member 17 centered and axially aligned in the adapter sleeve 15. The bayonet member 17 has on its rearward end an annular groove 20 which presents an annular surface 21 on which teeth 22' of gears 22 of the drawbar mechanism may take hold to pull the adapter 10 and tool 11 rearwardly thus causing the shoulder 23 on the tool to seat against a face 24 of the spindle cap 25. The bayonet member 17 has a collar 26 threadedly mounted on its forward end and the collar 26 has a spherical surface 27 on its rearward end adapted to mate with a spherical surface 28 that is formed on the forward end of the sleeve 15. This permits a slight angular misalignment of the bayonet member 17 in the bore 18 to occur due to unbalanced forces that may be exerted by the teeth 22' of the drawbar mechanism 13, which unbalanced forces are due to the inherent looseness of the parts that allows their uneven movement, or due to an initial slight angular misalignment of the tool 11 when it is inserted into the bushing 14.

The collar 26 may be adjusted to a desired tightness and locked into position by a pin 29 before the adapter unit 10 is inserted in place in the tool 11. When a proper adjustment has been made, the yieldable washer 19 tends to centralize the bayonet member 17 in the bore 18 and holds it centralized until such time as uneven lateral forces may be applied to it. These uneven lateral forces are prevented, however, from being transmitted to the centering bushing 14 where they might affect the location of the tool 11 and therefore the accuracy of alignment of the tool 11 and the spindle 12 is not affected.

The specific drawbar 13 used in conjunction with the above described bayonet type adapter 10 is aligned in tandem axially with and rearwardly of said adapter and is aligned coaxially with the spindle 12 which is journaled for rotation in bearings 30 and 31 in the spindle carrier 32 of the machine. A gear 33 is in driving engagement with the spindle 12 by means of axial mating splines 34 and the gear 33 receives its drive from a gear 35 that is powered by a conventional spindle motor (not shown).

Figure 3:
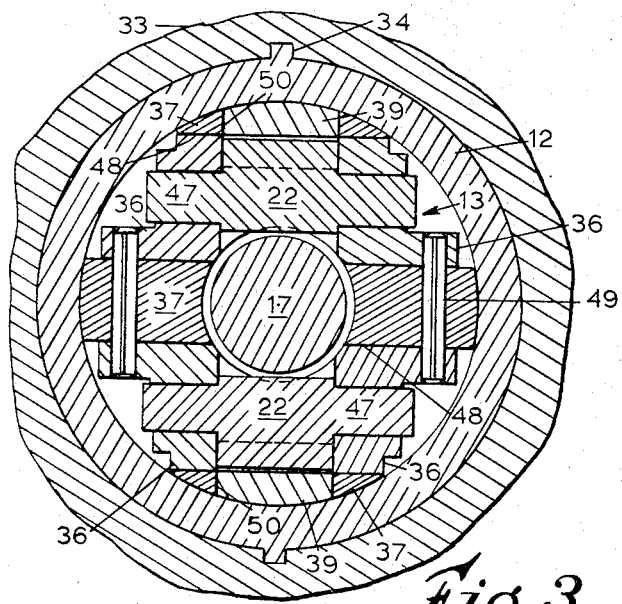
FIG. 3 is a section of FIG. 1 as viewed on line 3—3 thereof.
Figure 4:
FIG. 4 is a detailed view in elevation of one part within the assembly of FIG. 1.
Figure 5:
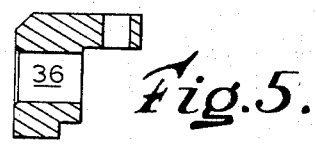
FIG. 5 is a section view of part of FIG. 4 on line 5—5 indicated thereon.
Figure 6:
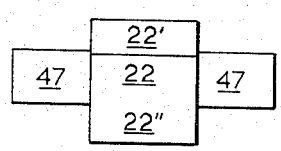
FIGS. 6 and 7 are detailed views in elevation of a further part within the assembly of FIG. 1, FIG. 7 being a right side view of FIG. 6.
Figure 7:
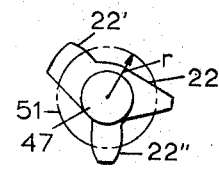

The drawbar mechanism 13 includes the pair of gears 22 journaled on trunnions 36 in a carriage 37 that is reciprocable longitudinally in a bore 38 in the spindle 12. A rack 39 is also provided for reciprocable movement in the bore 38 and a compression spring 40 is effective between the carriage 37 and the rack 39 to hold a face 37' on the carriage 37 against a face 14' of the gripping sleeve 14, but not with sufficient force to cause it to grip the tool 11. The detailed views shown in FIGS. 4 through 7, 9 through 12 and the section view of FIG. 3 are intended to provide a clearer understanding of the intra-relationships of the trunnion 36, the carriage 37, the rack 39 and the gears 22 by showing in detail their physical shapes. A shaft 41 is attached to the rack 39 and a piston 42 is provided on the shaft 41 to be reciprocable in a chamber 43 formed in the carrier 32. A source of fluid under pressure (not shown) is used in a conventional way to effect movement of the piston 42 and of the rack 39 and its related parts in the rearward direction against the bias force of a series of Bellville spring washers 44 that are arranged in a bore 45 in the spindle 12 to exert a strong and continuous pressure acting forwardly against a shoulder 46 on the sleeve 41. This causes the rack 39, which is joined thereto, to move the gear teeth 22" forwardly and the gear teeth 22' and bayonet 17 rearwardly.

FIG. 3 shows that the gears 22 are journaled on shafts 47 in the trunnions 36 and that these are held in bores 48 in the carriage 37 and fixed therein by pins 49. It is also shown that the rack 39 extends through a slot 50 in the carriage 37 to operate the gears 22 and that all of these parts are mounted as a unit in the bore 48.

Figure 2:
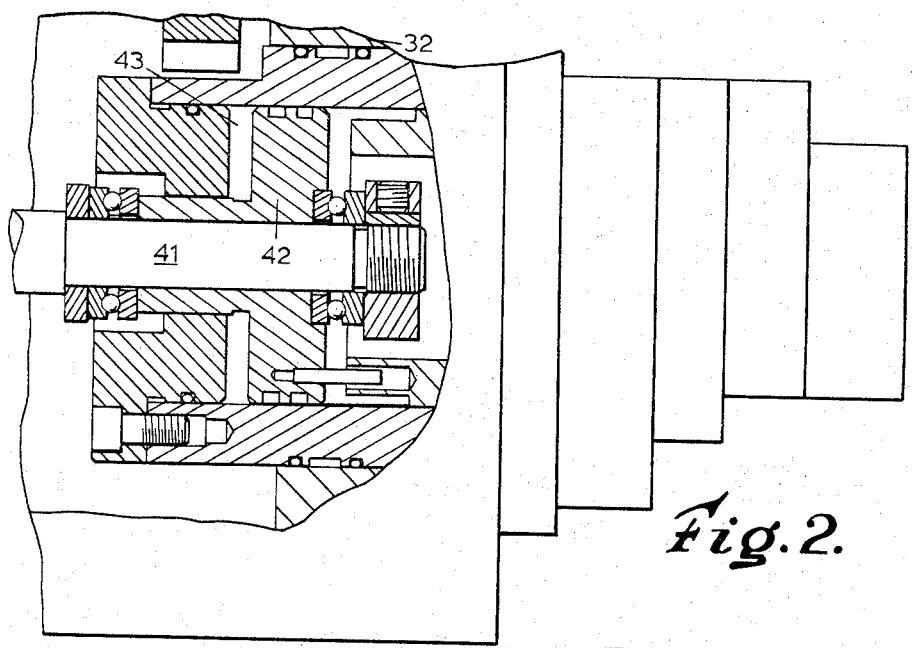

FIGS. 1 and 2 show the drawbar mechanism 13 and the sleeve 14 in position to secure the tool 11 in the spindle 12. At this time there is no fluid pressure in the chamber 43 and the tool shoulder 23 is seated against the face 24. As described earlier, the gears 22 are rotatable about their shafts 47 as fulcrums to seat the tool. When the shoulder 23 and face 24 are firmly engaged, a secondary action takes place. Since the tool 11 is seated and held against further rearward axial movement, the gear teeth 22' are prevented from moving to a more rearward position. The points of contact on the pitch circles 51 of the gears 22 between the teeth 22' and the surface 21, become the new fulcrums and the force from the spring washers 44 acts on the teeth 22" at twice the radius $r$ (FIG. 7) whereas the resistance force from the sleeve 14 is acting on the shafts 47 only at the radius $r$. This gives a mechanical advantage of two to one with the result that the face 37' of the carriage 37 delivers a force having a magnitude of twice that developed by the spring washers 44 against the sleeve 14. The sleeve 14 is axially compressed and distorts to decrease its inside diameter and at the same time grips and centers the tool 11 as a result of this distortion.

To remove the tool 11, sufficient fluid pressure is introduced into the chamber 43 through conventional control valves and piping (not shown) to cause the piston 42 to move rearwardly with the sleeve 41 and to cause the shoulder 46 to shift the rack rearwardly against the force of the spring washers 44. This carries the gear teeth 22" rearwardly also. As a result there is a removal of the forces that otherwise cause the carriage face 37' to press against the sleeve face 14'. The gears 22 are then rotated sufficiently to move the teeth 22' forward and outwardly from the spindle center-line to release the tool and permit removal thereof.

It is apparent from the description that a bayonet adapter 10 has been provided which can be combined with a tool 11 to be held in place by a quick acting, axially movable drawbar mechanism 13, which adapter does not transmit any lateral forces that might otherwise prevent the accurate axial alignment of the tool 11 in the spindle 12.

What is claimed is:
1. A bayonet adapter for a tool to be secured in a machine tool spindle by a drawbar mechanism comprising in combination:
   (a) an adapter sleeve including means for securing said adapter sleeve to the tool with the forward end thereof in the tool,
   (b) a bayonet member extending loosely and axially through said adapter sleeve and having a surface thereon at its rearward end adapted for connection with the drawbar mechanism,
   (c) means for providing a connection between said adapter sleeve and bayonet member for the transmission of axial forces therebetween and permitting a limited swivel movement of said bayonet member about the forward end thereof in said adapter sleeve,
   (d) means for yieldably holding said bayonet member in axial alignment in said adapter sleeve.
2. The combination of claim 1 wherein:
   (a) said adapter sleeve has a spherical surface on the forward end thereof,
   (b) said bayonet member extends through said adapter sleeve and the spherical surface thereon,
   (c) a spherical surface is provided on said bayonet member and mates with the spherical surfaces of said adapter sleeve, and
   (d) said means for holding said bayonet member also urges said bayonet member rearwardly to hold said spherical surfaces in contact, said spherical surfaces thereby comprising said means for providing a connection.
3. The combination of claim 1 wherein:
   (a) said adapter sleeve has an annular face around the rearward end thereof,
   (b) said bayonet member has a shoulder therearound, and
   (c) said means for yieldably holding said bayonet member is a resilient member held in compression between said annular face and said bayonet member shoulder.

References Cited
UNITED STATES PATENTS 3,023,675  3/1962  Stephan _____ 90—11.1
2,739,773  3/1956  Rougemont _____ 287—21 XR FRANCIS S. HUSAR, *Primary Examiner.*